(12) United States Patent
Givelberg et al.

(10) Patent No.: US 8,694,575 B2
(45) Date of Patent: Apr. 8, 2014

(54) DATA-INTENSIVE COMPUTER ARCHITECTURE

(71) Applicants: Edward Givelberg, Baltimore, MD (US); Sandor Szalay, Baltimore, MD (US)

(72) Inventors: Edward Givelberg, Baltimore, MD (US); Sandor Szalay, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 13/675,419

(22) Filed: Nov. 13, 2012

(65) Prior Publication Data
US 2014/0074904 A1    Mar. 13, 2014

Related U.S. Application Data

(60) Provisional application No. 61/658,189, filed on Jun. 11, 2012.

(51) Int. Cl.
*G06F 15/16* (2006.01)

(52) U.S. Cl.
USPC ........................................................ 709/201

(58) Field of Classification Search
USPC ......... 709/201, 204, 205, 208–211, 213–214, 709/217–218, 248; 707/770, 966–974, 707/999.01; 712/28–31; 715/733–759
See application file for complete search history.

(56) References Cited

U.S. PATENT DOCUMENTS

| | | | | |
|---|---|---|---|---|
| 8,046,373 B2* | 10/2011 | Chen et al. | ..................... | 707/757 |
| 8,190,827 B2* | 5/2012 | Eidus et al. | ..................... | 711/148 |
| 2004/0088293 A1* | 5/2004 | Daggett | ............................ | 707/6 |
| 2010/0192148 A1* | 7/2010 | Chen et al. | ........................ | 718/1 |
| 2011/0060939 A1* | 3/2011 | Singhal et al. | ................. | 714/4.3 |

OTHER PUBLICATIONS

Givelberg et al., "MPI-DB, A Parallel Database Service Software Library for Scientific Computing," Sep. 21, 2011, Springer-Verlag Berlin Heidelberg, Proceedings of the 18th European MPI Users' Group Meeting (EuroMPI 2011), pp. 339-341, skysrv.pha.jhu.edu/~givelberg/papers/EuroMPI2011.pdf.*
Givelberg et al., "An Architecture for a Data-Intensive Computer," Sep. 10, 2011, a John Hopkins University website at (skysrv.pha.jhu.edu/~givelberg/papers/), skysrv.pha.jhu.edu/~givelberg/papers/DataIntensiveComputer.pdf.*
Bryany, "Data-Intensive Supercomputing: The case for IDSC," 2007, a Carnegie Mellon University website at www.cs.cmu.edu/~bryant/pubdir/, www.cs.cmu.edu/~bryant/pubdir/cmu-cs-07-128.pdf.*

* cited by examiner

*Primary Examiner* — Ruolei Zong
(74) *Attorney, Agent, or Firm* — Quarles & Brady, LLP

(57) ABSTRACT

A data-intensive computer includes a processing sub-system formed by a plurality of processing servers, a database sub-system formed by a plurality of database servers configured to form a collective database, and a unifying operating system environment. The unifying operating system environment extends across the processing sub-system and the database sub-system to coordinate operation of the plurality of processing servers and the plurality of database servers to act as components in a single data-intensive computer and presents the database sub-system to an application running in the data-intensive computer as a layer in a memory hierarchy of the data-intensive computer.

19 Claims, 3 Drawing Sheets

DATA-INTENSIVE COMPUTER ARCHITECTURE

CROSS-REFERENCE TO RELATED APPLICATION(S)

This application claims the benefit of U.S. Provisional Patent Application Ser. No. 61/658,189 filed on Jun. 11, 2012 and entitled "Data Intensive Computing".

BACKGROUND OF THE INVENTION

The field of the invention is general computer architecture and, more particularly, systems and methods for data intensive computing. More specifically, the present invention is a computer architecture for a system capable of executing programs performing multi-petabyte data analysis.

The traditional process of scientific discovery consists of systematic observation, experimentation, measurement and data collection, leading to the creation of a theory that explains past observations and predicts the results of future experiments. In virtually every field of science, technological progress has led to the construction of high-throughput measurement instruments, such as telescopes, high-energy particle accelerators, gene sequencing machines, and the like. These high throughput measurement instruments generate very large data sets from observation of complex physical systems. On the other hand, theoretical description of complex physical phenomena starts with a set of basic laws, typically expressed as partial differential equations, whose consequences are investigated with the help of simulation experiments using computational models.

The availability of large experimental and simulation datasets is changing the way science is practiced. Comparison between theory and observation has become a difficult problem that often requires analysis of very large data sets. In many instances special-purpose hardware and software have been developed. Such solutions are expensive and time consuming. Increasingly there is a need for a general-purpose computational capability with petascale datasets.

This demand exists not only in science, but businesses rely, with increasing regularity, on gaining competitive or strategic business information from very-large datasets. For example, Ian Ayres, in his book, Super Crunchers: Why Thinking-by-Numbers Is the New Way to Be Smart, describes how business, from airlines to supermarkets, are looking to process massive datasets with increasing regularity. Of course, as noted above, hardware and software capable of processing such datasets are not generally available. Accordingly, as Ian Ayres describes, these business are forced to rely upon specialized business that have developed or can develop the special-purpose hardware and software, and the expertise to operate this special-purpose hardware and software, necessary to processes very-large datasets. As more businesses deploy petascale databases, there will be increasing demand for general-purpose computational capability to mine these data sets for useful information.

While improvements in computer hardware have enabled this data explosion, the traditional computer architecture and components used within the traditional computer and computer network have failed to keep pace. Referring to FIG. 1, a traditional computer network 100 is illustrated. The computer network 100 is formed by one or more workstations 102 that are connected to one or more servers 104. The workstations 102 may have more or less high-performance hardware systems and the servers 104 generally include more high-performance and substantially robust hardware systems than the workstations 102. However, regardless of the underlying performance of the hardware, such as clock speeds, memory size, and the like, the underlying hardware architecture of computer systems, both servers and workstations, and, by extension, the software architecture designed to operate these hardware architectures is generally similar and has been generally stagnant.

Specifically, referring to FIG. 1, a general hardware architecture 106 is illustrated that is representative of the hardware architecture employed in both workstations 102 and servers 104. Specifically, the hardware architecture 106 includes one or more CPUs 108, which may include one or more local caches 110, which forms a first layer in a memory hierarchy. The remaining layers in the memory hierarchy are accessible to the CPU 110 through a bridge 112. Specifically, the other layers in the memory hierarchy include a random access memory (RAM) 114 and, in some cases, an additional non-local cache 116. While memory and cache design evolutions have been great over the years, they generally adhere to the concept of placing one or more levels of comparatively fast random access memory in close proximity (access proximity) to the CPU 108. In any case, traditional computer memory hierarchies include one or more local caches 110, RAM 114, and one or more non-local caches 116.

In more recent times, dedicated graphics processing units (GPUs) 118 have been adapted from processors utilized to simply drive a display 120 to a secondary, specialized processor that the CPU 108 can utilize to offload tasks fitting the specialized capabilities of the CPU 108, such as transcoding operations and many others. In any case, the traditional computer architecture 106, regardless of workstation or server, regardless of whether the computer architecture is from the 1990s or more recent times, provides a CPU 108 and memory 114 and may be supplemented by secondary processing and memory components, such as a GPU 118 and various caches 110, 116 dedicated to particular situations. In this regard, the above-described components may be conceptualized as a CPU/memory sub-system 122.

The computer architecture 106 also includes a bus or multiple buses 124 that connect the above-described CPU/memory sub-system 122 to other, slower components of the computer architecture 106. For example, the buses 124 may provide connections to a universal serial bus (USB) hub or controller 126 and/or dedicated, bus-connected I/O devices 128. Of course, I/O connections may vary substantially; however, in all cases, the bus 124 provides connections to one or more hard drives 130. These hard drives 130 may take many forms and, more recently, include hardware advances such as solid-state drives, but are uniformly present in workstations or personal computers 102 and servers 104. This is because all traditional notions of computer architecture can be conceptualized as, at a minimum, including a CPU/memory sub-system 122 and a mass-storage sub-system 132.

Presently, hundreds of hard disks are needed to store a petabyte (PB) dataset. As a result, while the task of sorting a one terabyte data set can be efficiently performed on a traditional computer by a program consisting of just a few lines of code, sorting a petabyte data set requires developing special-purpose software that will depend on the hardware characteristics of the storage system used. More generally, computational tasks of $O(N \log(N))$ complexity, where N is the number of items in the data set, are feasible because for all practical data sets $\log(N){<}80$. Nevertheless, in addition to the complexity of the required hardware, presently such computations require very costly and time consuming development of special-purpose complex software.

Existing supercomputers are not well suited for data intensive computations, at least in part because they maximize CPU cycles but lack I/O bandwidth to the mass storage layer. Most supercomputers also lack disk space adequate to store PB-size datasets over multi-month periods.

Furthermore, commercial cloud-computing platforms do not provide a feasible solution. For example, recently, when mass storage becomes a limitation, remote or cloud storage is sought as a solution. However, when considering massive and data-intensive computer operations on the scale of PBs or factors of PBs, the data movement and access fees are excessive compared to purchasing physical disks, the I/O performance offered is substantially lower, and the amount of disk space provided is inadequate.

It would therefore be desirable to provide a general-purpose programmable computer to perform computations with large datasets, for example, at a minimum of the petabyte range.

SUMMARY OF THE INVENTION

The present invention overcomes the aforementioned drawbacks by providing a data-intensive computer that is formed from multiple server systems forming a processing and storage infrastructure that underlies the computer.

In accordance with one aspect of the invention, a data-intensive computer is provided that includes a processing sub-system formed by a plurality of processing servers, a database sub-system formed by a plurality of database servers configured to form a collective database, and a unifying operating system environment. The unifying operating system environment extends across the processing sub-system and the database sub-system to coordinate operation of the plurality of processing servers and the plurality of database servers to act as components in a single data-intensive computer and presents the database sub-system to an application running in the data-intensive computer as a layer in a memory hierarchy of the data-intensive computer.

In accordance with another aspect of the invention, a data-intensive computer is disclosed that includes a processing sub-system formed by a plurality of processing servers, a database sub-system formed by a plurality of database servers configured to form a collective database, and a unifying operating system environment extending across the processing sub-system and the database sub-system. The unifying operating system environment coordinates operation of the plurality of processing servers and the plurality of database servers to act as components in a single data-intensive computer and implements a memory system for the single data-intensive computer to deliver pages between the processing sub-system and the database sub-system such that the plurality of database servers provide O(log N) access to individual random pages of data stored within the collective database storing N pages of data.

DETAILED DESCRIPTION OF THE INVENTION

Figure 2:
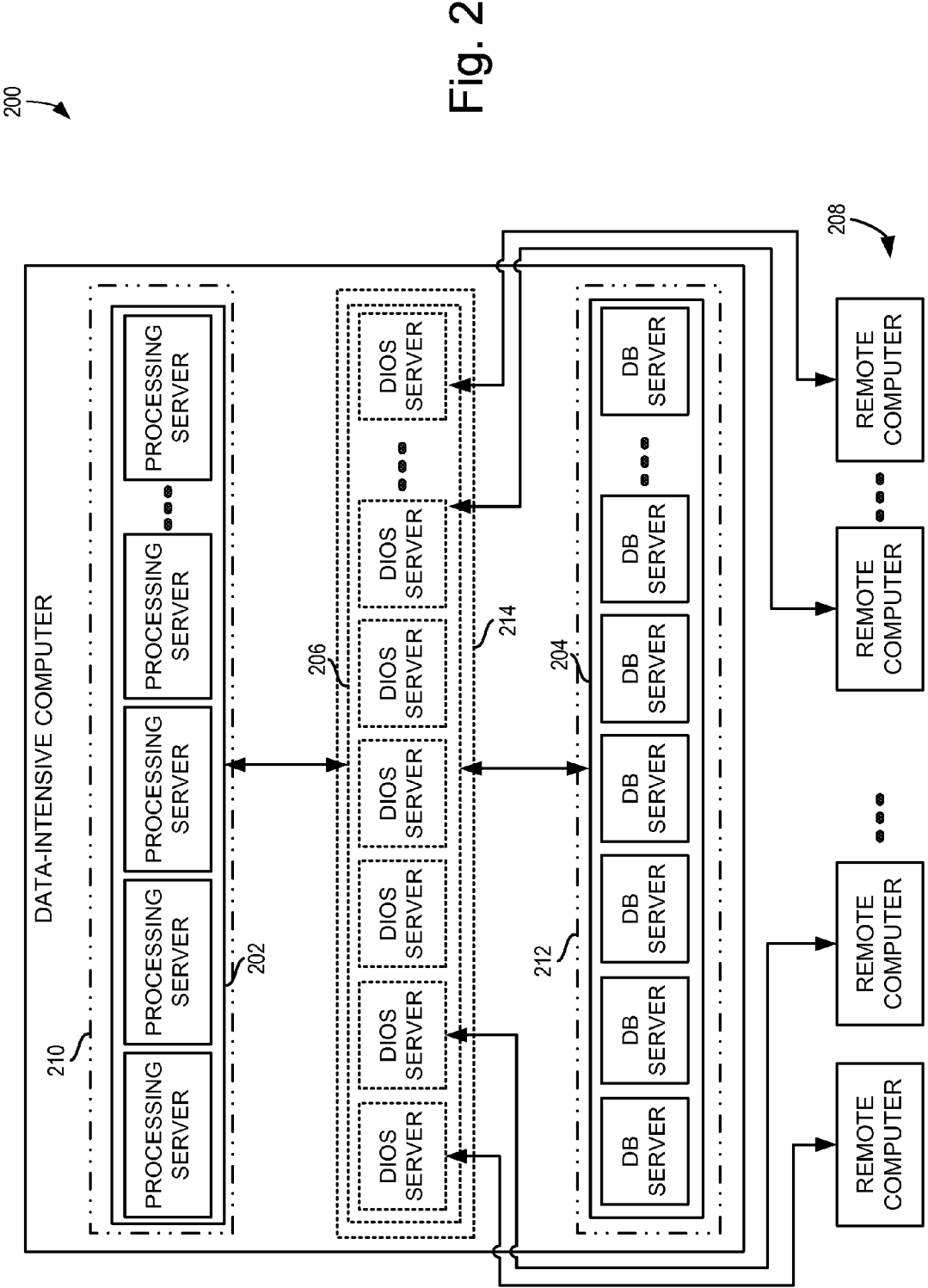
FIG. 2 is a schematic diagram of a data intensive computer architecture in accordance with the present invention.

The new computer architecture of the present invention is illustrated in FIG. 2. The present invention creates an integrated system, or data-intensive computer 200, where the sub-components include a cluster of processing nodes 202 and a set of database servers 204. The processing nodes 202 and the database servers 204 operate as a single data-intensive computer 200 through the use of a data-intensive operating system (DIOS). The DIOS is a software suite that runs on all of the servers of the data-intensive computer. That is, the DIOS forms a unifying operating system environment that coordinates the operation of all of the servers to act as components in a single data-intensive computer 200. High-level user applications are transformed by DIOS into a collection of lower level parallel processes executed by the servers of each sub-system 210, 212, 214.

It is contemplated that an intermediate DIOS cluster 206 may, optionally, be included that further ties the systems of the data-intensive computer 200 together to operate as a single data-intensive computer 200, and not a group of autonomous systems with individual instances of operating systems that are merely joined by a network and/or shared resources.

The sub-components are connected via extremely fast networks. The data-intensive computer 200 may be accessed by a remote computer 208. As illustrated, dedicated DIOS servers 206 may be desirable in some implementations to improve the overall efficiency of the data-intensive computer.

The processing nodes 202 may take the form of a high-performance cluster, HPC or processing sub-system 210 and the database servers 204 are interconnected to form a database sub-system 212. As noted above, the database servers 204 may be connected using a fast network, such as the Infiniband, or the 10 Gb/sec Ethernet, and the storage servers collectively form a massively parallel database. If included, the DIOS cluster 206 may, collectively, form an operating system sub-system 214.

The data stored in the DB sub-system 212 is partitioned into blocks. In the course of an application execution data blocks are communicated by DIOS between the database sub-system 212 and the processing servers 202. The DIOS may use a database management system (DBMS) to effectively transform the data sub-system 212 into a memory layer of the data-intensive computer 200. An aspect of the present invention is that the DBMS or other system is used to implement random access memory (RAM) functionality in the data-intensive computer 200. This means that accessing (storing and retrieving) a block of data uses approximately the same amount of time, regardless of the physical location of the data block. For a data set consisting of N blocks the RAM functionality within the data-intensive computer provides an O(log(N)) access time to any one of the blocks of data. This may be realized by a system using binary trees. Rather than implement a system that will provide such RAM functionality for a Petascale data set from scratch, the database of the database sub-system 212 may be used.

Figure 1:
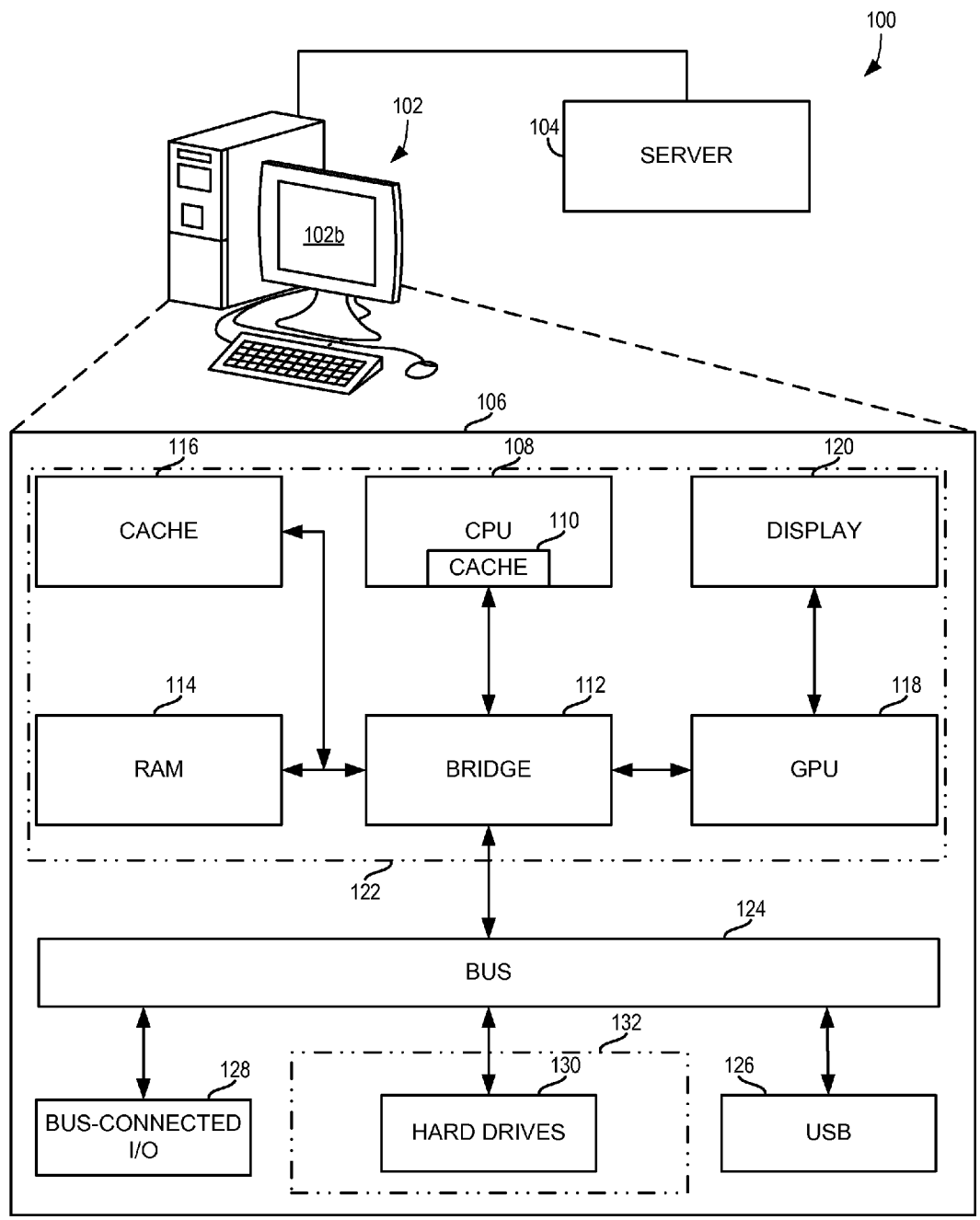
FIG. 1 is a schematic diagram of a traditional computer system and the architecture of computers and servers that form traditional computer systems and networks.

Thus, as used herein, the term "database" at least includes any system that provides O(log N) time access to a memory page. Within the context of the data-intensive computer 200 of the present invention, a single physical device that can hold all of the memory needed for the computation is generally not feasible using currently-available memory and storage systems. Instead, the memory may be partitioned into pages and the pages are ordered according to their address. In doing so, there is generally not any physical device that can provide access to a page within a theoretically bounded time, like traditional RAM operates in a traditional computing system such as described with respect to FIG. 1. As such, the time to access one of the N ordered pages has the worst case theoretical complexity of O(log N) when the access is implemented using a binary search. It is, of course, also possible to use techniques like hashing to try to get O(1) access time.

As an illustration of one implementation of the memory functionality using the database sub-system 212, we consider an example where the user application performs a computation with a very large three-dimensional array of double precision floating point numbers. We store the array in the database as follows. The array is broken up into atoms, where each atom is a small cube. For example, the cube size may be 4×4×4 or 8×8×8 double precision numbers, where each number is represented using 8 bytes of memory. A few bits of additional information, such as the data type, the indices of the corner of the cube and others, may be stored in each atom. Atoms are stored as binary blobs in a single large database table and are indexed using the Morton Z-curve index. The small atom size is chosen in order to optimize the function of the database.

Array data is partitioned into pages, which correspond to memory blocks mentioned above, The size of the page is chosen to be 64×64×64 elements (which approximately equals 2 MB). Different page size may be chosen, depending on the application and on the hardware characteristics of the system. In our example the array page will reside wholly inside a physical disk and will never be split among disks. An array page contains an integral number of array atoms. When a computing process requires access (read or write) to a specific array element, the DIOS will enable access (read or write) to the whole array page. The communication of pages between the computing nodes and the database nodes is accomplished by page clients and page servers, which are part of the DIOS.

Furthermore, the Morton Z-index may be used to order the array pages themselves. This is advantageous because we can choose the array size in such a way that each page is contiguous both in the three-dimensional index space and in the one-dimensional Z-index. We assign pages to disks in such a way that for any random three-dimensional index in the domain of the array the collection of nearby pages consist of pages from all database nodes and from all database disks. This can be achieved by a kind of a two-dimensional striping.

An example of how pages could be assigned to disks follows. Suppose we have three nodes and they have 3, 2, and 4 disks, respectively. We can label each disk by an identification of the form i.j, where i is the node identification and j is the identification of the disk attached to node i. For example, 3.1 is the first disk of node 3. We can then generate a sequence of disk ids as follows: 1.1 2.1 3.1 1.2 2.2 3.2 1.3 2.1 3.3 1.1 2.2 3.4 1.2 2.1 3.1 1.3 2.2 3.2, and so on. As we have assumed before, the pages are arranged according to the Z-index. We can therefore assign the Z-ordered sequence of pages one-to-one to the sequence of disk ids above. Such assignment of pages to disks maximizes the throughput and the utilization of both the database and the network.

In one exemplary implementation with 4 database servers, the above structure was able to deliver 4 GB/sec of array data using 4 fast Ethernet links to computational processes. Assuming a 2 MB page size, this translates into 2000 pages per second. In some circumstances, about 50 pages will be delivered concurrently. A possible implementation is where one page server is configured to run on each database node, while each computing process runs a page client. Each page server will communicate with all page clients. It is possible to deploy more than one page server on each database node, but in the case of data being communicated asynchronously we expect one page server to be sufficient. The asynchronous communication of the data may be implemented, for example, using the MPI direct memory access (DMA) operations. The performance of the page servers may be further sped up by utilizing SSDs. The bulk insert/read of atoms to/from the database could also be performed asynchronously.

User applications for the data-intensive computer may be developed using a high-level programming, such as Fortran or C++, combined with a system for controlling parallelism. An example of such a system is one of many available implementations of the Message Passing Interface (MPI) standard.

When one of the application processes needs array data to execute its program, it requests the corresponding page of array data using a page client. The request is communicated over the network to the page server, which queries the database to obtain all the array atoms of that page. The collection of these data atoms is then sent to the page client, which provides it to the user application process. Similarly, writing array data by a user application process causes the page client to send data to the page server, which inserts the corresponding array atoms into the database table by executing an appropriate database query.

The mechanism described above for communicating pages of array data between the database and the user application processes is analogous to the mechanism of paging that is used to implement virtual memory in the traditional computer. However, in the present invention, the pages of memory are stored in the database and the random access functionality is implemented using the database query processing system. Thus, again, as used herein, the term "database" at least includes any system that provides O(log N) time access to a memory page.

Figure 3:
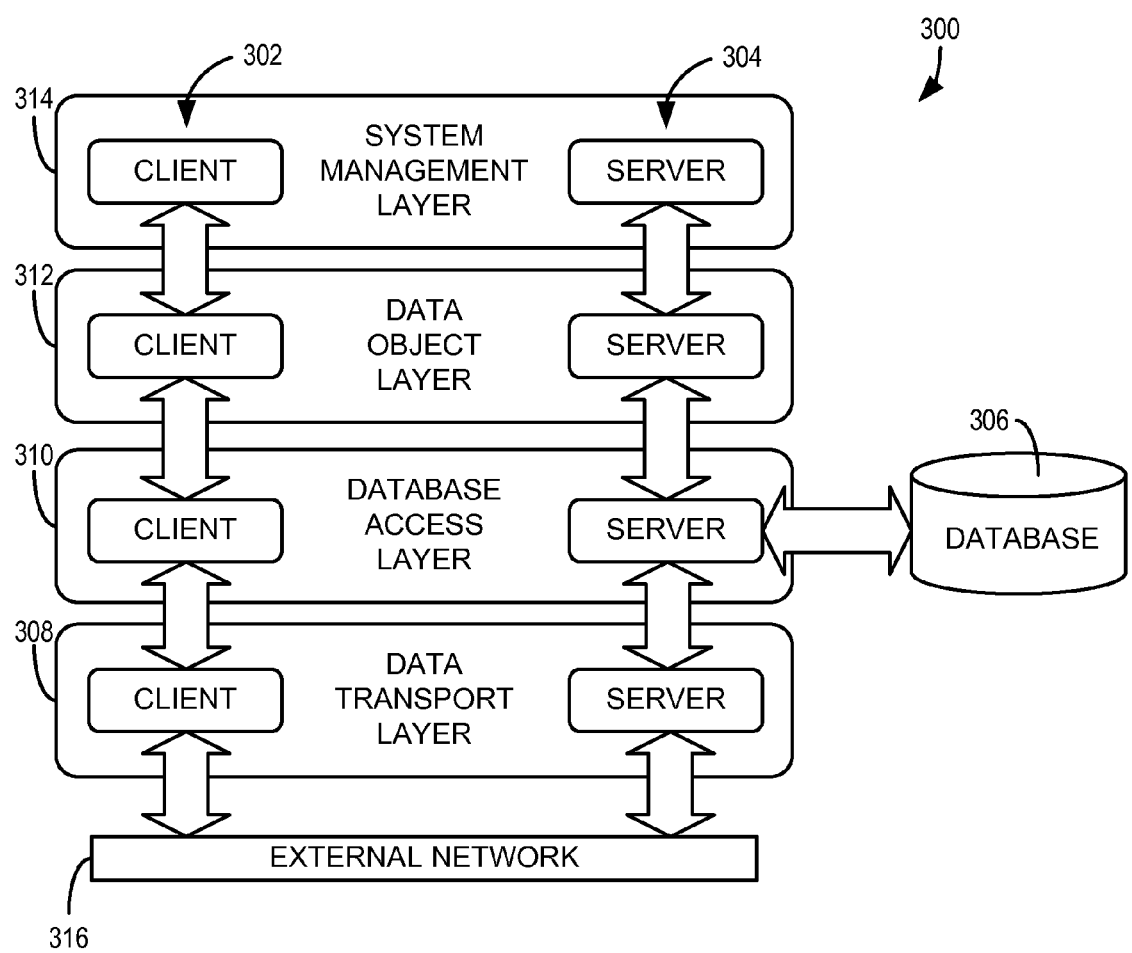
FIG. 3 is a schematic diagram of an operating system for use with the data intensive computer of FIG. 2.

Referring to FIG. 3, a schematic illustration of the software architecture of the data-intensive computer is illustrated. The following paragraphs describe an example DIOS, implemented as a software library, referred herein as MPI-DB 300. The software library provides database services to scientific computing processes, provides C, C++ and Fortran language bindings on Windows and Linux, and supports SQL-Server and MySQL databases.

At a basic level, referring to FIG. 3, the library can be conceptualized as including two compatible software packages: a client package 302 and a server package 304. User applications are compiled and linked against the client. The server accepts connections from clients at a known network address, services clients' requests by querying a database 306 and sending the results back to the clients.

With reference to software architecture, MPI-DB 300 can be built as a layered structure, as shown in FIG. 3, analogous to multi-layer protocols used in computer network communications. Such a design is flexible and extensible. This layered structure can include a data transport layer 308, a database access layer 310, a data object layer 312, and a system management layer 314.

As shown in FIG. 3, the data transport layer 308 is the lowest layer in the hierarchy of MP-IDB 300. The data transport layer 308 can provide the basic functionality for establishing and managing the connection between clients and servers over an external network 316. Notably, the external network 316 is external to the high-bandwidth network that is internal to the data-intensive computer 200 of FIG. 2. This design encapsulates packet transmission in the data transport layer 308. Several independent implementations of the data transport layer 308 may be desirable. This is advantageous because it makes possible to deploy the software across many different platforms. We have two implementations of the data transport layer: one using UDT (a UDP based Data Transfer protocol) sockets and the other using the MPI-2 standard, as further discussed below. As noted above, the MPI protocol is a widely-used standard in scientific computing. MPI installations are available for a wide range of operating systems and computer networks, and in many instances benchmarking tests have shown MPI to be among the fastest, currently-available, protocols for data transfer.

The database access layer 310 provides basic functionality to remotely execute queries and access the database 306. The database access layer provides the data object layer 312 with a narrow set of abstract operations needed to manipulate MPI-DB programming objects in the database 306. The data access layer 310 encapsulates all SQL queries and includes drivers for major databases, such as SQL Server, MySQL and PostgreSQL.

The data object layer 312 contains the description of the user-defined programming objects that are stored in the database 306, including their physical storage layout, and provides access and manipulation methods for these objects. User-defined objects are serialized by the associated client 302, sent to the server 304, and unserialized by the server 304, to be subsequently stored in the database 306. For example, the above mentioned array pages and the associated page servers and page clients are parts of the data object layer 312. Thus, the data object layer 312 facilitates the presentation of the database sub-system as a layer in a memory hierarchy of the data-intensive computer to applications executing, at least in part, at the processing sub-system.

The system management layer 314 maintains a resource map, describing all the resources (storage and servers) available in the global database system. It includes a caching system for grouping applications' I/O requests and a scheduler assigning the I/O requests to the database servers 204 of FIG. 2. The system management layer 314 can also handle administration functions, managing all user related information, including managing user logins and monitoring user connections.

With respect to implementation of the software library, MPI-DB 300 can be developed as object-oriented software in C++ and, in some cases, made available under a BSD open-source software license.

An exemplary use of the software library is described below for a scientific application consisting of several parallel MPI processes continuously generating output that needs to be stored (specifically, by the software library to a database). In this example, the user application is written in C++ with MPI. It is linked against the software library and there are two parallel processes at runtime, whose ranks are 0 and 1.

The user interaction with the software library starts by defining the data structures that will be stored in the database. In this example, the two parallel MPI processes jointly perform a computation using a single three-dimensional array of 128×128×128 double precision floating point numbers. The array is divided between the two processors, with processor 0 holding in its local memory the [0 . . . 127]×[0 . . . 127]× [0 . . . 63] portion of the array and processor 1 holding the [0 . . . 127]×[0 . . . 127]×[64 . . . 127] part. Correspondingly, each process defines an mpidb::Domain object subdomain and an mpidb::Array object a. The exemplary code is as follows:

```
// this user process has rank=MyID,
// which in our example is either 0 or 1
   MPI_Comm_rank(MPI_COMM_WORLD, &MyID);
   mpidb::Domain subdomain(0, 127, 0, 127, 64*MyID, 64*MyID+63);
   mpidb::Array a (subdomain, mpidb::DOUBLE_PRECISION);
// generate a stream of array data objects
   mpidb::DataStream s(a);
   mpidb::DataSet d( )
// DataSet d is a single object, common to both process
// DataSet d will contain two data streams
   d.AddStream(s);
```

The application will perform repeated computation of the data array, with each process periodically storing its portion of the data array in the database. Each process will therefore generate a stream of arrays. This is expressed in the definition of the mpidb::DataStream object s.

Finally, the application defines the mpidb::DataSet object d, which, in contrast to previously defined objects, is a single (distributed) object common to both processes. After each process adds a data stream to this data set, it will contain two streams.

Having defined the data structures, each of the two MPI processes attempts to establish a connection with an MPI-DB server. This is achieved by defining an mpidb::Connection object c and executing on it the ConnectToServer method with a given server address. Exemplary code is as follows:

```
   mpidb::Connection c;
   char*ServerAddress="128.220.233.155:52415";
   if (!c.ConnectToServer(ServerAddress))
   {
   cerr<<"Failed to connected to server . . . disconnecting"<<endl;
   return 0;
   }
   else
   cout<<"Connected to server at:"<<ServerAddress<<endl;
```

Upon successful connection, each of the two MPI processes respectively processes their own mpidb::Connection object c and each is allocated a dedicated MPI-DB server thread to service requests over this connection.

The connection object can now be used by each process to login to the database and create there a new data set, according to the previous definition of the mpidb::DataSet object d. Exemplary code as follows:

```
   if (!c.AccessDataBase(username, password)
   {
   cerr<<"Failed to access the database."<<end 1;
   return 0;
   }
// create an image of d in the database
   If (!c.CreateDataSet(d))
   {
   cerr<<"Failed to create a new data set"<<endl;
   return 0;
   }
```

In addition to creating the data set in the database, the CreateDataSet method performs an operation of associating (binding) the user mpidb::DataSet object d with the corresponding database data set using the mpidb::Connection object c. The data can now be generated and stored in the database. The local portion of the data array may be called data. Exemplary code is as follows:

```
// the local portion of the 128×128×128 array
   double data [128] [128] [64];
   for (int TimeStep=0; TimeStep<MaxTimeStep; TimeStep++)
   {
// compute the values of the local data array
   ComputeValues(data);
// push the values of data into the DataStream s
   s<<data;
   }
``` c. DisconnectFromServer( )

After computing the new values of data, the data is stored in the database with the single instruction s<<data, which pushes the content of the array data into the stream s using the connection c. At the end of the program each process disconnects from the MPI-DB server.

The above example demonstrates how a scientific application can store arrays in the database. The user is no longer required to write SQL queries and be concerned with the layout of the tables in the database. The MPI-DB construct provides the user with a set of programming objects (data structures and methods to manipulate the data structures) that is flexible and sufficient for most data-intensive applications, such as scientific applications. In some cases, the ability to access database tables directly can be exposed to advanced users with specialized needs through the lower layers of the MPI-DB software library.

We now consider another example where the data-intensive computer architecture is used to compute a fast Fourier transform (FFT) of a large three-dimensional array. We consider a test system for a small data-intensive computer, consisting of 8 nodes, where 4 of the nodes will be used for computation and the other 4 are database nodes. In some examples, the computational nodes may run the Linux operating system, while the database nodes may use Microsoft's Windows. However, as described above, the unifying operating system allows the computational and database nodes to operate as a common computer. Each of the database nodes has 24 one-terabyte hard disks attached to it with a peak throughput of 100 MB/sec for each disk. Each node has therefore 24 TB of disk space with peak throughput capacity of 2.4 GB/sec. All of the nodes of the data-intensive computer are interconnected by a fast Ethernet network providing a 10 Gb/sec throughput between every two nodes. The computing nodes have 8 cores each, with 48 GB of RAM on each node.

Let N=16384. An array of $N^3$ double precision numbers requires 32 TB of disk space, where each double precision number is stored in 8 bytes, and can easily be stored in the database of our test system, which has the capacity of 96 TB. The computation of an FFT of this array will be performed by computing one-dimensional FFTs in all three directions. We will use 32 processes in parallel, assigning one process for each core of the 4 computational nodes. During the computation the domain of the array will be partitioned into 32 slabs, one per process. In traditional parallel computations, this means that each slab is loaded into the RAM and is immediately available to the process to which it is assigned. However, it is not possible to load the complete, for example, 1 TB slab into, say, approximately 1.5 GB of RAM that is available to each process. The partition of the domain is therefore a partition of virtual memory.

In accordance with the present invention and MPI-DB, the partition of the domain is accomplished using the DomainPartition class, which takes as an argument the local subdomain of the executing process and constructs a global domain which is the union of the local subdomains. The local subdomains in our example are disjoint, but more complex domain partitions with overlapping local domains are possible.

High level code for the computation of the FFT may be as follows:

```
int p=mpidb::MyID( )
for (int i1=512*p; i1<512*(p+1); i1++)
  for (int i2=0; i2<16384; i2++)
    fft1(i1, i2); // perform a 1-dimensional fft of 16384 numbers.
```

This code is translated by the compiler into lower level code that will include DIOS system calls to read and write the array pages that are necessary for this computation. Compiler code generation will depend on the available resources in the data-intensive computer. For example, the compiler may determine that each processor will do batches of 64*64 one-dimensional FFTs. Before processor 0 executes fft1(0, 0) in the first iteration of the above loop, all the pages that contain the array elements (0, 0, *) may be accessed. This is a "line" of 256 pages, whose total volume is 0.5 GB. If these pages are assigned to all of, say, 96 disks more or less equally, then their retrieval from the database to the RAM of the computing node could take close to 0.5 seconds. Once the data has been copied, processor 0 can do fft1 for the first batch, where (i1, i2) run from (0, 0) up to (63, 63). Concurrently with that processing, the next line of pages will be accessed, which is all pages that contain array elements (0, 64, *). In our exemplary configuration, each process is able to hold at most 11 lines of pages in memory. Therefore, the results of the completed executions of fft1 have to be stored back in the database. This is accomplished asynchronously, increasing the overall parallelism in the computation. The total time to compute the FFT may be estimated to equal approximately 3 times the reading and writing time of the whole array from and to the database sub-system 314. In this example, the total time is 3*2*(32 TB/4 GB/sec)=48K sec=13.5 hours. This timing is not optimal for some situations, but better paging schemes can be used to achieve faster computation. Furthermore, the system itself may be configured differently to achieve better overall utilization of the processing units and the available network bandwidth.

The present invention has been described in terms of one or more preferred embodiments, and it should be appreciated that many equivalents, alternatives, variations, and modifications, aside from those expressly stated, are possible and within the scope of the invention.

The invention claimed is:

1. A data-intensive computer comprising:
   a processing sub-system formed by a plurality of processing servers;
   a database sub-system formed by a plurality of database servers configured to form a collective database;
   a unifying operating system environment extending across the processing sub-system and the database sub-system to coordinate operation of the plurality of processing servers and the plurality of database servers to act as components in a single data-intensive computer;
   wherein the unifying operating system environment is further configured to present the database sub-system to an application running in the data-intensive computer as a layer in a memory hierarchy of the data-intensive computer;
   wherein the unifying operating system environment is further configured to implement a memory system for the data-intensive computer to deliver pages between the processing sub-system and the database sub-system such that the plurality of database servers provide O(log N) access to individual random pages of data stored within the collective database storing N pages of data; and
   wherein the unifying operating system environment presents a system management layer, a data object layer, a database access layer, and a data transport layer to coordinate operation of the processing sub-system and the database sub-system.

2. The data-intensive computer of claim 1 wherein the unifying operating system environment is configured to monitor data requirements of the application and facilitate access to the database sub-system based on the data requirements of the application.

3. The data-intensive computer of claim 1 further comprising a plurality of operating system servers acting as a distributed scheduler for the plurality of database servers to dynamically allocate and reduce connections to selected ones of the plurality of database servers in the database sub-system based on data requirements of the application.

4. The data-intensive computer of claim 3 wherein the operating system sub-system is configured to facilitate transparent and scalable input/output (I/O) operations between the plurality of processing node servers and the plurality of database servers.

5. The data-intensive computer of claim 1 wherein the unifying operating system environment is configured to logically represent a specific data object stored in the database sub-system as a single data object when the specific data object is physically distributed across the plurality of database servers of the database sub-system.

6. The data-intensive computer of claim 5 wherein the unifying operating system environment is configured to generate a physical mapping of the specific data object physically distributed across the plurality of database servers of the database sub-system and utilize the physical mapping to present the specific data object as the single data object to the application.

7. The data-intensive computer of claim 1 wherein the data transport layer is configured to manage connections by client computers accessing the data-intensive computer over a network external to the data-intensive computer using at least two independent implementations of the data transport layer, wherein a first implementation of the data transport layer uses UDP-based Data Transfer (UDT) sockets.

8. The data-intensive computer of claim 7 wherein a second implementation of the data transport layer uses message passing interface 2 (MPI-2) protocols.

9. The data-intensive computer of claim 7 wherein the unifying operating system environment presents a server software package and a client software package and wherein the sever software package and the client software package are implemented using at least one of the UDT sockets and the MPI protocols.

10. The data-intensive computer of claim 1 wherein the database access layer facilitates execution of queries and access requests implicating the database sub-system.

11. The data-intensive computer of claim 1 wherein the data object layer contains a description of user-defined programming objects stored in the database sub-system.

12. The data-intensive computer of claim 11 wherein the description of user-defined programming objects includes a physical storage layout of the data-intensive computer and provides access and manipulation methods for user-defined programming objects.

13. The data-intensive computer of claim 1 wherein the system management layer maintains a resource map describing storage and server resources available in the database sub-system and provides a caching system for grouping I/O requests from the application and a scheduler assigning the I/O requests to the plurality of database servers of the database sub-system.

14. The data-intensive computer of claim 1 further comprising a high-bandwidth network configured to connect the processing sub-system, the database sub-system, and the operating system sub-system.

15. The data-intensive computer of claim 14 further comprising a secondary network, separate from the high-bandwidth network, configured to provide access to the data-intensive computer by remote computers and wherein the plurality of processing servers includes at least 90 processing servers and the plurality of database servers includes at least 12 database servers.

16. The data-intensive computer of claim 1 wherein the collective database is in excess of a petabyte of storage.

17. A data-intensive computer comprising:
a processing sub-system formed by a plurality of processing servers;
a database sub-system formed by a plurality of database servers configured to form a collective database;
a unifying operating system environment extending across the processing sub-system and the database sub-system to coordinate operation of the plurality of processing servers and the plurality of database servers to act as components in a single data-intensive computer;
wherein the unifying operating system environment is further configured to implement a memory system for the single data-intensive computer to deliver pages between the processing sub-system and the database sub-system such that the plurality of database servers provide 0(log N) access to individual random pages of data stored within the collective database storing N pages of data; and
wherein the unifying operating system environment presents a system management layer, a data object layer, a database access layer, and a data transport layer to coordinate operation of the processing sub-system and the database sub-system.

18. The data-intensive computer of claim 17 wherein the unifying operating system environment is further configured to present the database sub-system to an application running in the data-intensive computer as a layer in a memory hierarchy of the data-intensive computer.

19. The data-intensive computer of claim 17 wherein the unifying operating system environment is configured to logically represent a specific data object stored in the database sub-system as a single data object when the specific data object is physically distributed across the plurality of database servers of the database sub-system.

\* \* \* \* \*